United States Patent
Tanaka et al.

[11] Patent Number: 5,229,208
[45] Date of Patent: Jul. 20, 1993

[54] RESIN MOLDED BODY FOR OPTICAL PARTS

[75] Inventors: Akira Tanaka, Kawasaki; Takehisa Takoshima, Sapporo; Shinpei Nagatani, Yokohama; Hisashi Sawada, Kawasaki; Eietsu Takahashi, Yokohama, all of Japan

[73] Assignee: Fujitsu Limited, Kawasaki, Japan

[21] Appl. No.: 799,894

[22] Filed: Dec. 2, 1991

Related U.S. Application Data

[63] Continuation of Ser. No. 255,976, Oct. 11, 1988, abandoned.

[30] Foreign Application Priority Data

Oct. 9, 1987 [JP] Japan ................... 62-255683
Dec. 25, 1987 [JP] Japan ................... 62-327231
Dec. 25, 1987 [JP] Japan ................... 62-327233

[51] Int. Cl.⁵ ................................ D02G 3/00
[52] U.S. Cl. ......................... 428/373; 428/375; 428/392; 428/395; 385/141; 385/143; 385/145; 385/123; 525/439
[58] Field of Search .......... 385/141, 143, 123, 145, 385/392; 428/395, 375, 373, 372; 525/439, 199; 526/348.4; 252/317

[56] References Cited

U.S. PATENT DOCUMENTS

| | | | |
|---|---|---|---|
| 3,423,483 | 1/1969 | Anyos et al. | 525/439 |
| 4,521,483 | 6/1985 | Sasaki et al. | 428/373 |
| 4,542,957 | 9/1985 | Ishiwari et al. | 350/96.34 |
| 4,576,438 | 3/1986 | Tatsukami et al. | 428/373 |
| 4,746,711 | 5/1988 | Serini et al. | 525/439 |
| 4,919,514 | 4/1990 | Ebert et al. | 350/96.34 |
| 5,018,828 | 5/1991 | Ohdaira et al. | 428/373 |

FOREIGN PATENT DOCUMENTS

| | | | |
|---|---|---|---|
| 0113870 | 7/1984 | European Pat. Off. | 525/439 |
| 60-93407 | 9/1985 | Japan . | |
| 56-1006604 | 1/1986 | Japan | 423/373 |
| 62-220559 | 3/1988 | Japan . | |

Primary Examiner—Patrick J. Ryan
Assistant Examiner—J. M. Gray
Attorney, Agent, or Firm—Staas & Halsey

[57] ABSTRACT

The present invention provides a resin molded body for optical parts, and comprises a solid solution of a polycarbonate and a polyester carbonate.

In the resin molded body of the present invention, when the amount incorporated of the polyester carbonate is increased, the light transmission loss is increased, but the distortion temperature is considerably raised and a high heat resistance is obtained.

5 Claims, 7 Drawing Sheets

RESIN MOLDED BODY FOR OPTICAL PARTS

This application is a continuation of application Ser. No. 07/255,976, filed Oct. 11, 1988, now abandoned.

FIELD OF THE INVENTION

The present invention relates to a resin molded body for optical parts. The resin molded body of the present invention is especially valuable as an optical part such as a core of a plastic optical fiber or a plastic lens.

DESCRIPTION OF THE RELATED ART

As the core of the optical fiber, there has been used polystyrene (PS) or poly(methyl methacrylate) (PMMA), but the heat distortion temperature (glass transition temperature) of these materials is low and the core is softened in a high-temperature atmosphere maintained of 100° C., or higher and therefore, application is limited to a temperature of about 80° C. or lower. As a means of overcoming this defect, a plastic optical fiber has been proposed comprising a core composed of a polycarbonate (PC) having an excellent transparency and a high heat distortion temperature of about 135° C. (see, for example, Japanese Examined Patent Publication No. 52-40987 and Japanese Unexamined Patent Publication No. 60-32004).

Nevertheless, even when the plastic optical fiber has a core composed of PC, if a resin composed mainly of poly-4-methylpentene-1 (PMP) is used as the cladding material, as proposed in Japanese Unexamined Patent Publication No. 62-195606, when the optical fiber is abruptly heated from room temperature to a high temperature of about 130° C., extreme deformation of the optical fiber occurs due to the difference in the shrinkage caused by the difference in the thermal expansion coefficient of the PC and PMP and the thermal deformation of the PC. Accordingly, great advantages will be gained if a material having a higher heat resistance than that of PC, and able to be used as the core material of a plastic optical fiber, can be found.

SUMMARY OF THE INVENTION

Therefore, an object of the present invention is to provide a resin molded body for optical parts, which has an excellent optical characteristic and heat resistance.

In accordance with the present invention, there is provided a resin molded body for optical parts, which comprises a solid solution of a polycarbonate and a polyester carbonate.

As seen from FIG. 1, in the resin molded body of the present invention, when the amount incorporated of the polyester carbonate is increased, the light transmission loss is increased but the heat distortion temperature is considerably raised and a high heat resistance is obtained.

The resin molded body of the present invention can be used for optical parts, for example, a core of a plastic optical fiber, a plastic lens, a light guide, and a transparent substrate of an optical disk.

BRIEF DESCRIPTION OF THE DRAWINGS

FIG. 7b is a horizontal cross-sectional view diagram further illustrating the structure of the light guide of FIG. 7a;

DESCRIPTION OF THE PREFERRED EMBODIMENTS

Embodiments of the present invention will now be described in detail.

The polycarbonate (PC) valuable for use in the present invention can be represented by the following general formula:

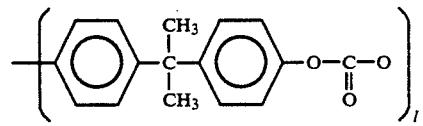

wherein l is an integer.

The polyester carbonate (PEC) used in the present invention can be represented by the following general formula:

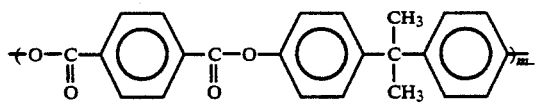

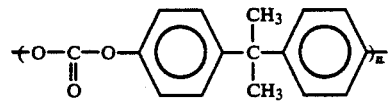

wherein m and n are integers.

The first embodiment, in which the resin molded body of the present invention is used as a core of a plastic optical fiber, will now be described.

APE KL1-9306 supplied by Bayer, which has a heat distortion temperature of 164° C., is used as the PEC and Panlite L1225 supplied by Teijin, which has a heat distortion temperature of 135° C., is used as the PC, and fibers having a diameter of 1 mm are prepared under the same conditions by the conjugate melt extrusion method, using these resins singly or as blends thereof at predetermined ratios as the core, and PMP (TPX MX002 supplied by Mitsui Petrochemical) having a melting point of 135° C. and a softening point of 175° C. is used as the cladding material. The transmission loss, change of the transmission loss, and the heat distortion temperature of each of these fibers were measured and the results shown in FIGS. 1 and 2 were obtained. Note, the change of the transmission loss observed after standing for 100 hours at 150° C. is plotted as the change of the loss.

Figure 1:
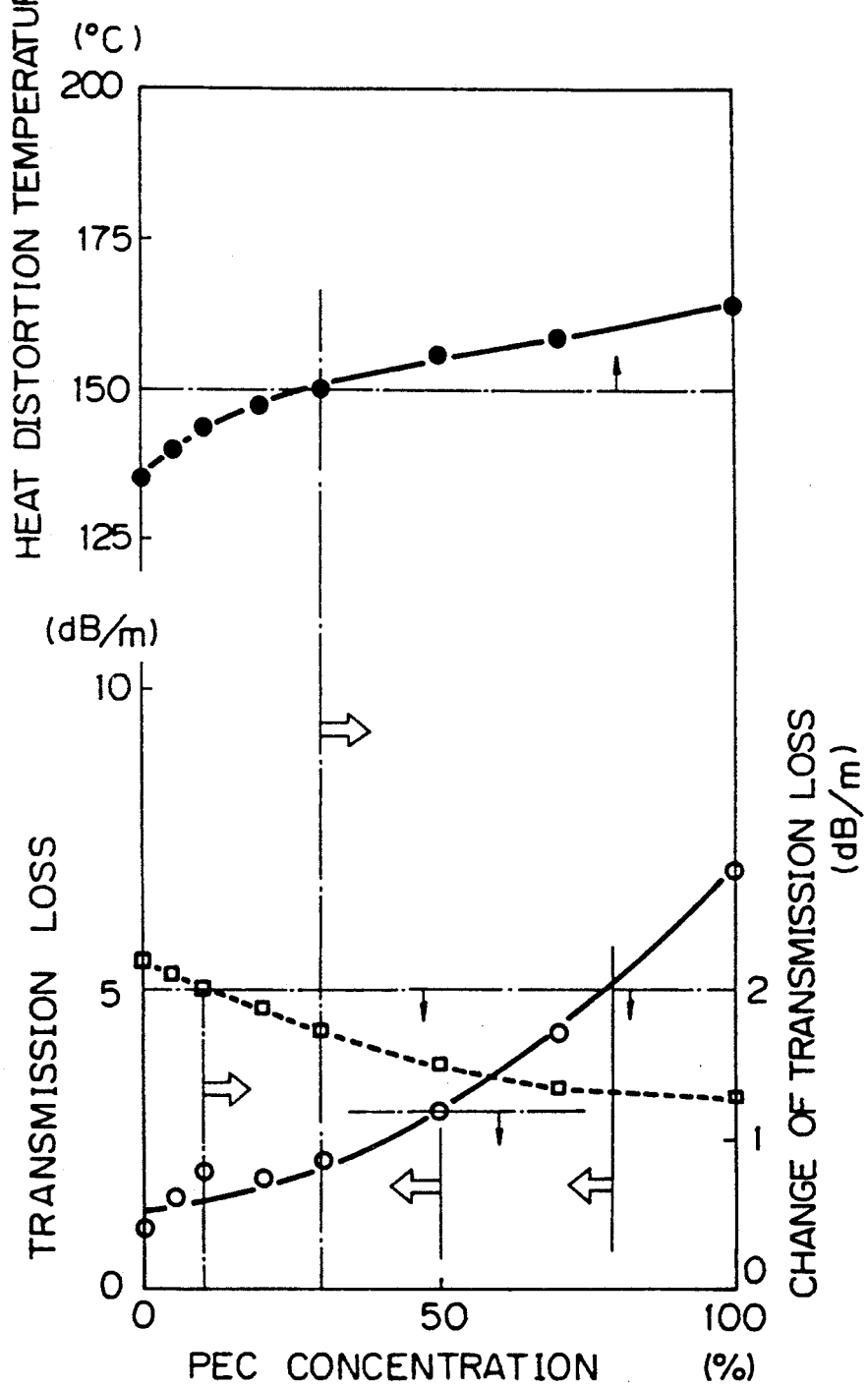
FIG. 1 is a graph illustrating the relationships between the mixing ratio of PC and PEC, the transmission loss, the change of the transmission loss and the heat distortion temperature in the solid solution of PC and PEC according to the present invention.
Figure 2:
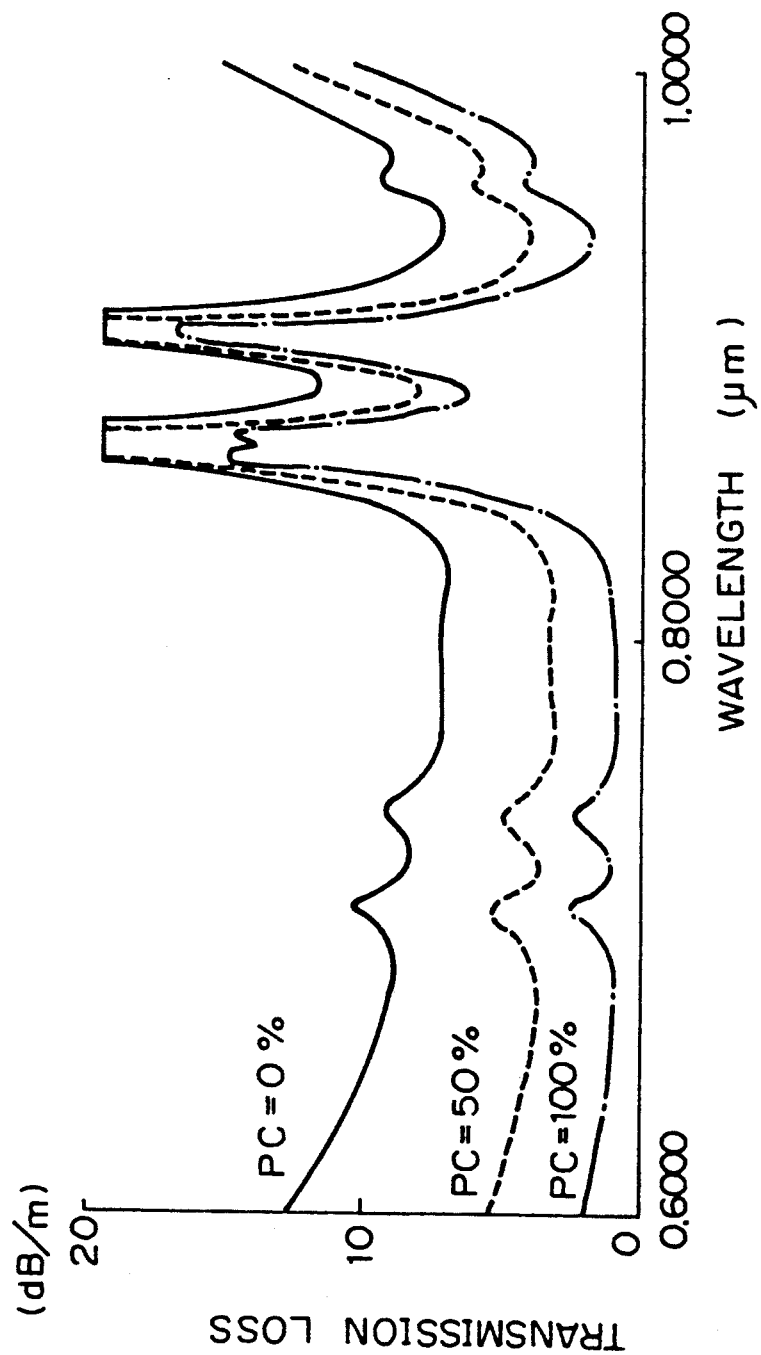
FIG. 2 is a transmission loss spectrum diagram obtained when the above-mentioned mixing ratio is changed.

As seen from FIGS. 1 and 2, where PEC alone is used as the core material, the transmission loss in the vicinity of the minimum loss window of 0.8 μm is 7.5 dB/m, and thus very high, but where PC and PEC are used at a ratio of 1/1, the transmission loss is an approximately intermediate value of 3 dB/m. The heat distortion temperature rises with an increase of the amount of PEC incorporated of PEC and the heat resistance is better than the heat resistance of PC alone, and when a fiber comprising PC and PEC at a ratio of 1/1 is subjected to a heat resistance test, no shrinkage is observed.

Furthermore, FIG. 1 shows that, if the concentration of PEC in the PC/PEC solid solution is 10 to 79% by weight, each of the transmission loss and the change of the transmission loss is smaller than 5 dB/m and good results are obtained. It is also found that, if the PEC concentration in the PC/PEC solid solution is at least 30% by weight, the heat distortion temperature is higher than 150° C., and thus this concentration is especially preferred, and that if the PEC concentration is not higher than 50% by weight, the transmission loss is smaller than 3 dB/m and especially good results are obtained. Accordingly, in the resin molded body of the present invention, the PEC concentration is preferably 30 to 50% by weight.

Figure 3:
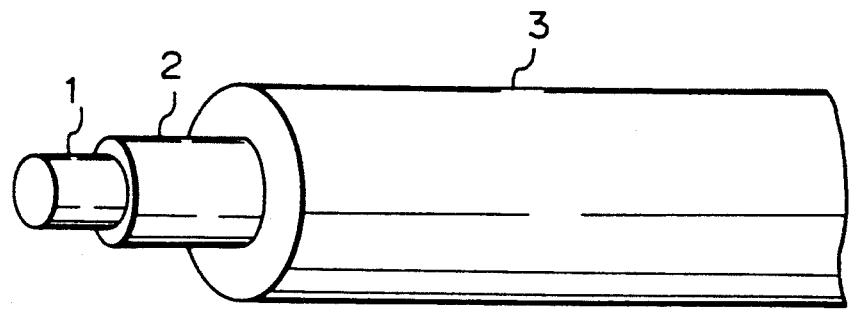
FIG. 3 is a diagram illustrating the structure of an optical fiber according to an embodiment of the present invention.

The so-obtained optical fiber comprises, as shown in FIG. 3, a core 1 and a cladding 2 covering the periphery of the core 1, and in general, the periphery of the optical fiber is covered with a covering material 3 not having a light-transmitting property.

In addition to the above-mentioned PMP, a blend of PMMA and polyvinylidene fluoride (PVDF$_2$) is preferably used as the cladding material of the optical fiber, since PMP or a PMMA/PVDF$_2$ blend have an excellent heat cladding material, preferably the amount of PMMA in the blend is at least 80% by weight, or the amount of PVDF$_2$ is at least 62% by weight.

Figure 4:
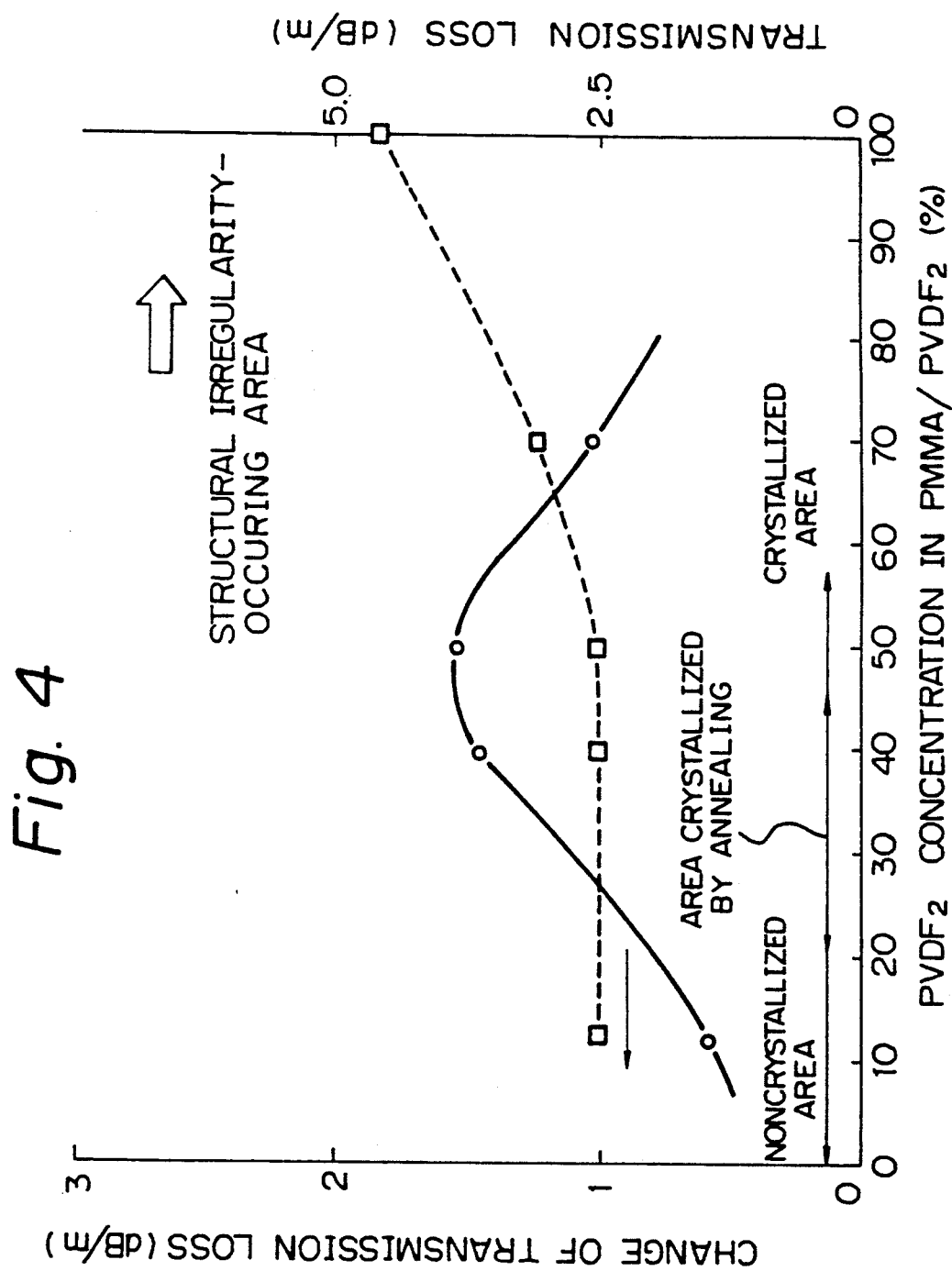
FIG. 4 is a graph illustrating the relationships between the mixing ratio of PMMA and PVDF$_2$, the transmission loss and the change of the transmission loss in an optical fiber having a PC/PEC core and a PMMA/PVDF$_2$ cladding.

Thus, optical fibers having a diameter of 1 mm were prepared under the same conditions by the conjugate melt extrusion method, using a PC/PEC solid solution (Panlite L1225/APE KL1-9306=1/1) as the core material and a PMMA/PVDF$_2$ blend as the cladding material. Paraglass HR-1000 supplied by Kyowa Gas Kagaku was used as the PMMA and KF Polymer #1000 was used as the PVDF$_2$. For the fibers, the transmission loss and change of the transmission loss were measured. The results are shown in FIG. 4. From the figure, it is understood that the PMMA/PVDF$_2$ blend for the cladding material should contain preferably PMMA in an amount of at least 80% by weight, more preferably at least 90% by weight.

Figure 5:
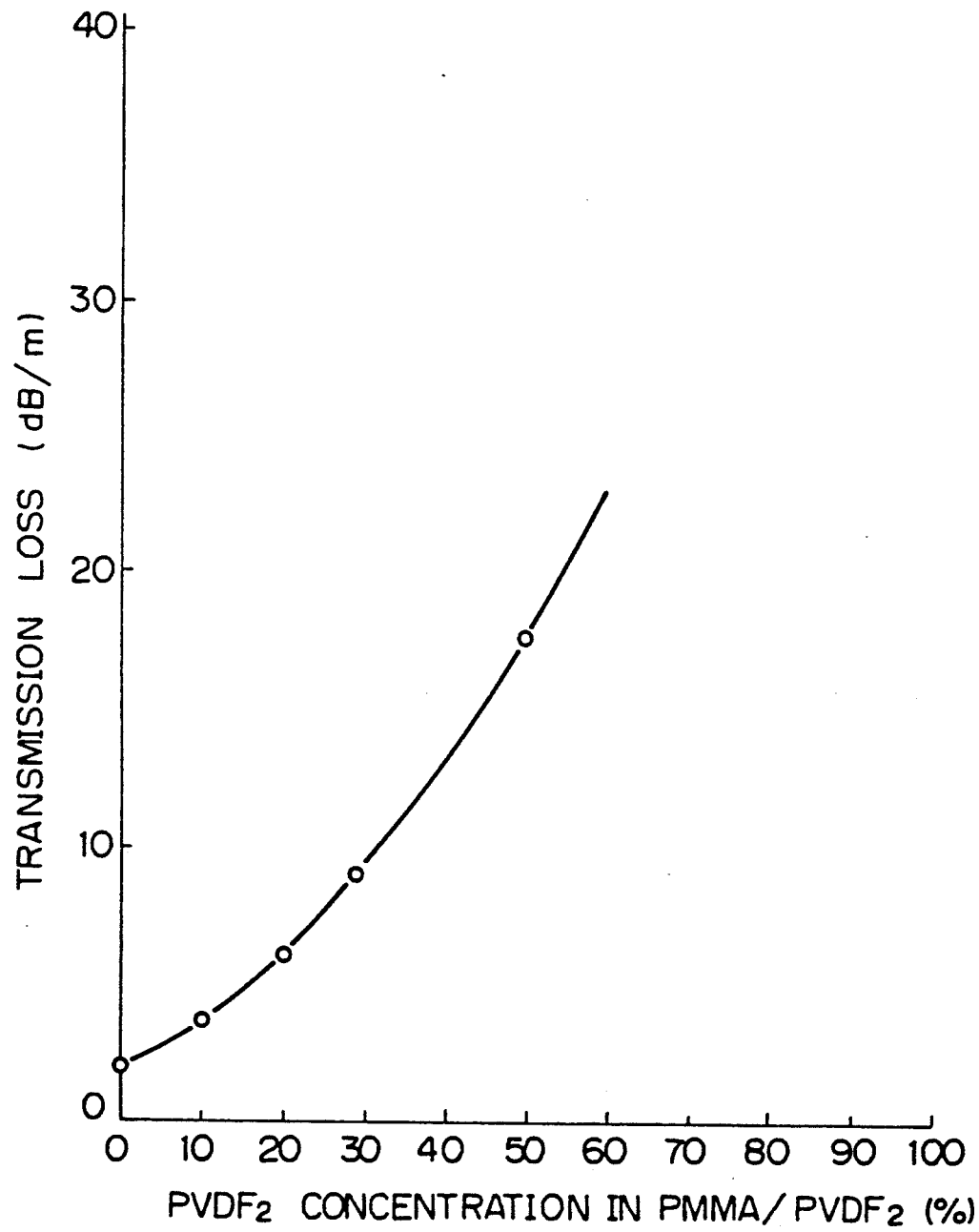
FIG. 5 is a graph illustrating the relationship between the mixing ratio of PMMA and PVDF$_2$ and the transmission loss in an optical fiber of a PMMA/PVDF$_2$ blend.

In FIG. 5, the transmission loss is shown for fibers having a diameter of 1 mm prepared using blends of the same PMMA and PVDF$_2$ as mentioned above. From the figure, it is revealed that the transmission loss of a molded body of the blend containing at least 80% by weight of PMMA is relatively low.

Figure 6:
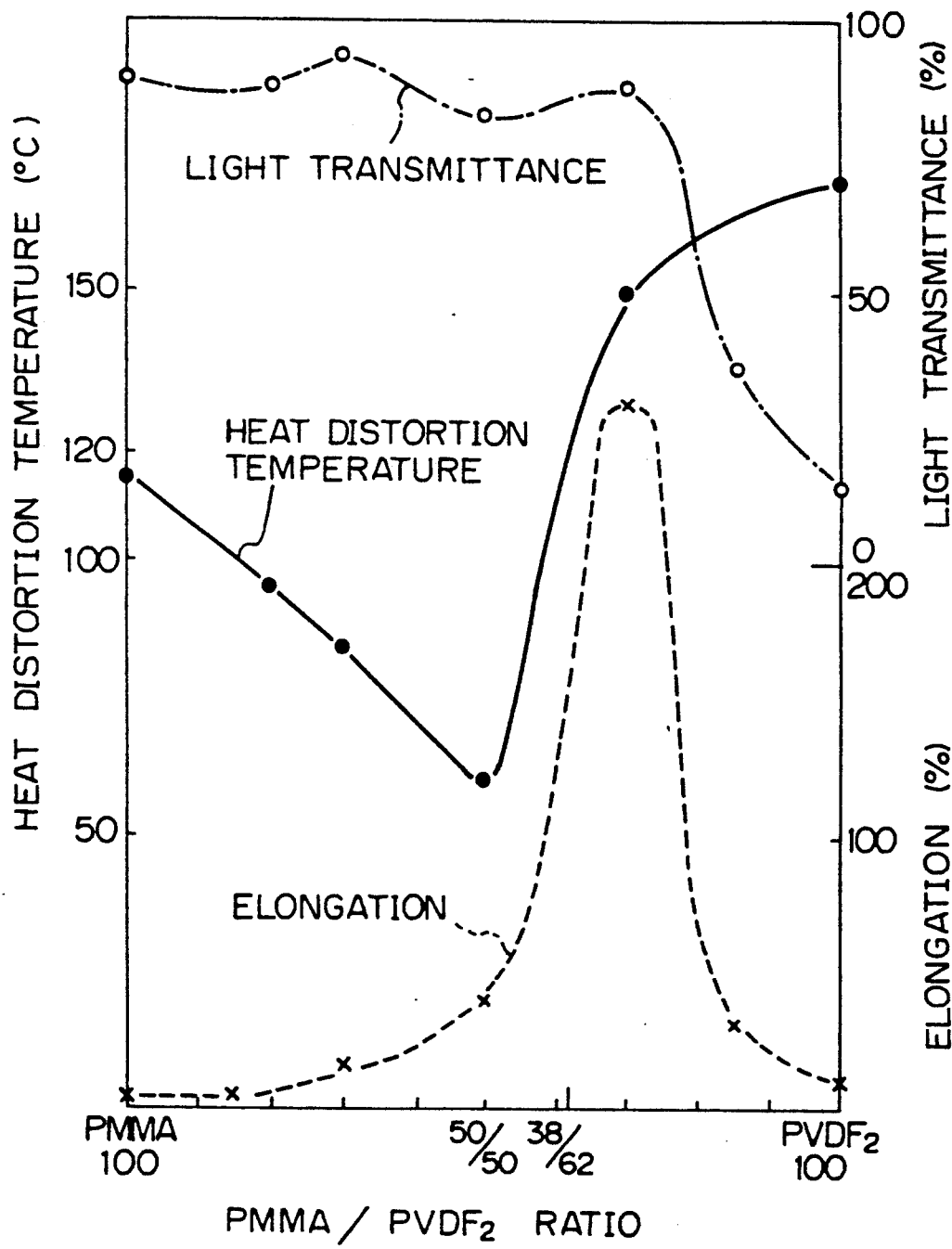
FIG. 6 is a graph illustrating the relationships between the mixing ratio of PMMA and PVDF$_2$, the heat distortion temperature, the elongation and the light transmittance in an optical fiber of a PMMA/PVDF$_2$ blend.

In FIG. 6 are shown the relationship of the heat distortion temperature, elongation and light transmittance of fibers which were prepared also using blends of the same PMMA and PVDF$_2$ as mentioned above. From the figure, it is proved that where the PMMA/PVDF$_2$ blend contains PVDF$_2$ in an amount of at least 62% by weight, a molded article of the blend exhibits a high heat distortion temperature, elongation and light transmittance.

A perylene or naphthalimide type organic fluorescent dye can be added to the resin molded body of the present invention constituting the core of an optical fiber as mentioned above, as with this addition of an organic fluorescent dye, it becomes possible to make light incident from the side face of the optical fiber. As typical examples of the perylene or naphthalimide type organic fluorescent dye, there can be mentioned perylene derivatives and naphthalimide derivatives represented by the following formula:

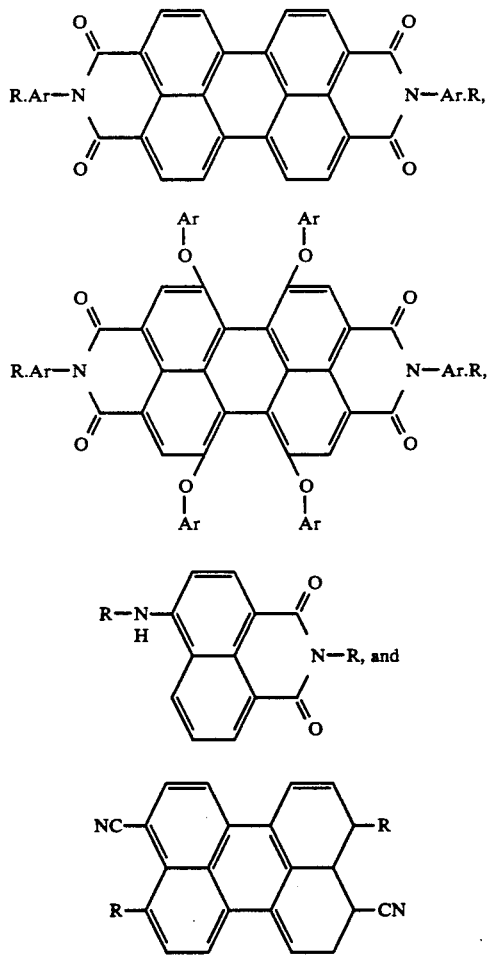

wherein Ar stands for an aryl group and R stands for an atomic group such as an alkyl group.

In the present invention, an organic fluorescent dye as mentioned above can be added to the cladding material according to need.

Figure 7A:
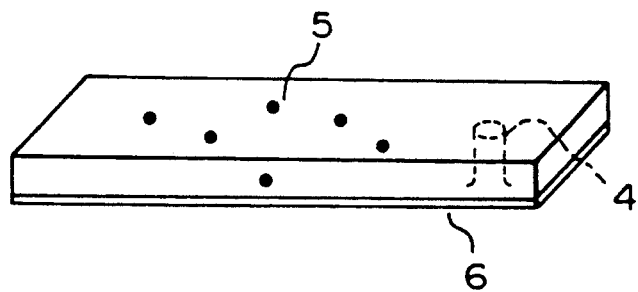
FIG. 7a is a perspective view diagram illustrating the structure of a light guide according to another embodiment of the present, invention.
Figure 7B:
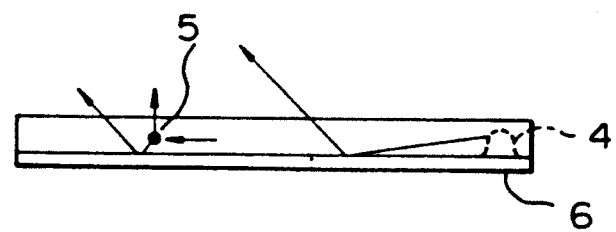

The second embodiment, in which the resin molded body of the present invention is used as a plate-shaped light guide used in a light display portion of a car component or the like, will now be described. As shown in FIG. 7a and FIG. 7b, respectively a perspective view and a sectional view, this light guide has a light source 4 in the interior thereof and comprises an organic fluorescent dye 5 absorbing light from the light source 4 and isotropically transmitting the light. A reflection film of a white paint, aluminum or the like having a light distribution property is formed on one surface (back surface) of the light guide and thus light is uniformly emitted from all of the other surface (front surface). Accordingly, the resin molded body of the present invention can be effectively used as a light guide having the above-mentioned structure.

Figure 8:
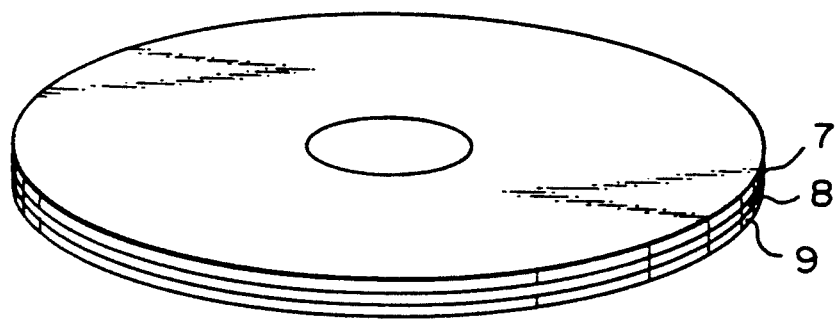
FIG. 8 is a diagram illustrating the structure of an optical disk substrate according to a still another embodiment of the present invention.
Figure 9:
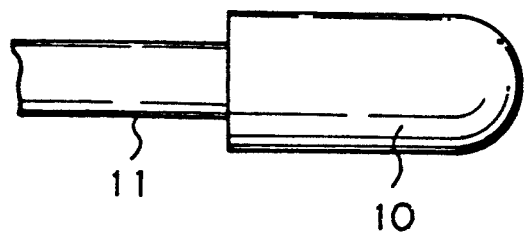
FIG. 9 is a diagram illustrating the structure of a plastic lens according to a still another embodiment of the present invention.

Moreover, the resin molded body of the present invention can be used as a transparent substrate of an optical disk, as shown in FIG. 8, or as a plastic lens as shown in FIG. 9.

The optical disk shown in FIG. 8 is constructed by forming, by vacuum deposition, an aluminum film 8 on an optical disk substrate 7 composed of the resin molded body of the present invention, and forming a protective film 9 on the vacuum deposited aluminum film 8. The plastic lens 10 shown in FIG. 9 is a non-spherical lens and is connected, for example, to an optical fiber 11 and used as a part of an optical fiber sensor.

According to the present invention, a resin molded body having an excellent optical characteristic and heat resistance can be provided. Especially, when this resin molded body is used as the core of a plastic optical fiber, an excellent plastic optical fiber having a very high heat resistance can be obtained, in which heat distortion does not occur even at a high temperature.

We claim:

1. A plastic optical fiber comprising:
    a core formed of a PC/PEC solid solution having a PEC concentration of 30 to 50% by weight, said PC/PEC solid solution being characterized by a heat distortion temperature of at least 150° C. and a transmission loss of less than 3 dB/m; and
    a cladding material on said core, said cladding material comprising a PMP resin or a PMMA/PVDF$_2$ solid solution.

2. A plastic optical fiber as set forth in claim 1, wherein said PMMA/PVDF$_2$ solid solution includes at least 80% by weight of PMMA.

3. A plastic optical fiber as set forth in claim 1, wherein said PMMA/PVDF$_2$ solid solution includes at least 62% by weight of PVDF$_2$.

4. A plastic optical fiber as set forth in claim 1, wherein said PC/PEC solid solution contains an organic fluorescent dye incorporated therein.

5. A plastic optical fiber as set forth in claim 4, wherein said dye comprises a perylene or naphthalimide type dye.

* * * * *

UNITED STATES PATENT AND TRADEMARK OFFICE
CERTIFICATE OF CORRECTION

PATENT NO. : 5,229,208
DATED : July 20, 1993
INVENTOR(S) : AKIRA TANAKA, TAKEHISA TAKOSHIMA, SHINPEI NAGATANI, HISASHI SAWADA and EIETSU TAKAHASHI It is certified that error appears in the above-indentified patent and that said Letters Patent is hereby corrected as shown below:

On the title page:

[30] Foreign Application Priority Data

"Dec. 25, 1987 [JP] Japan ..... 62-327233" should be

--Dec. 27, 1987 [JP] Japan ..... 62-327233--.

[56] References Cited - FOREIGN PATENT DOCUMENTS insert

--86-02653   5/86   Europe--

--0223056    5/87   Europe--

--European Search Report, Appln. No. 88402513, The Hague, August 7, 1989, Examiner Van Doremalen, J.C.H.--.

Signed and Sealed this

Seventeenth Day of January, 1995

Attest:

BRUCE LEHMAN

*Attesting Officer*  *Commissioner of Patents and Trademarks*